(12) United States Patent
Kubota

(10) Patent No.: US 7,478,861 B1
(45) Date of Patent: Jan. 20, 2009

(54) ALL TERRAIN VEHICLE WITH ADJUSTABLE SEAT

(75) Inventor: Satoshi Kubota, Shizuoka (JP)

(73) Assignee: Yamaha Hatsudoki Kabushiki Kaisha, Iwata-shi, Shizuoka-ken (JP)

( * ) Notice: Subject to any disclaimer, the term of this patent is extended or adjusted under 35 U.S.C. 154(b) by 0 days.

(21) Appl. No.: 12/017,691

(22) Filed: Jan. 22, 2008

(51) Int. Cl.
*B60N 2/02* (2006.01)

(52) U.S. Cl. ............. 296/65.13; 296/65.05; 297/344.11

(58) Field of Classification Search ............... 296/65.01, 296/65.05, 65.09, 65.13, 65.14; 297/344.11, 297/344.1
See application file for complete search history.

(56) References Cited

U.S. PATENT DOCUMENTS

| 6,582,004 | B1 | 6/2003 | Hamm |
| 6,994,388 | B2 | 2/2006 | Saito |

*Primary Examiner*—Joseph D Pape
(74) *Attorney, Agent, or Firm*—Jones Day

(57) ABSTRACT

An all terrain vehicle according to the present invention includes a rail in a longitudinal direction of the vehicle, and a seat on the rail and being adjustable in position in the longitudinal direction of the vehicle. The seat includes a rail engaging portion engageable with the rail. The rail engaging portion includes: a support extending downward from the rail engaging portion and contacting the rail; a plurality of projections in a forward direction of the support, the plurality of projections being spaced apart from each other in the longitudinal direction; and a rail holder in a rearward direction of the support, the rail holder holding the rail for longitudinal sliding movement. The rail has a plurality of bar-like parts disposed in a forward direction of the support to extend in a vehicle width direction. The bar-like parts are disposed at certain intervals therebetween in the longitudinal direction of the vehicle. The projections can fittingly receive at least one of the bar-like parts therebetween. The front end of the seat is pivotally movable upward about the support.

20 Claims, 9 Drawing Sheets

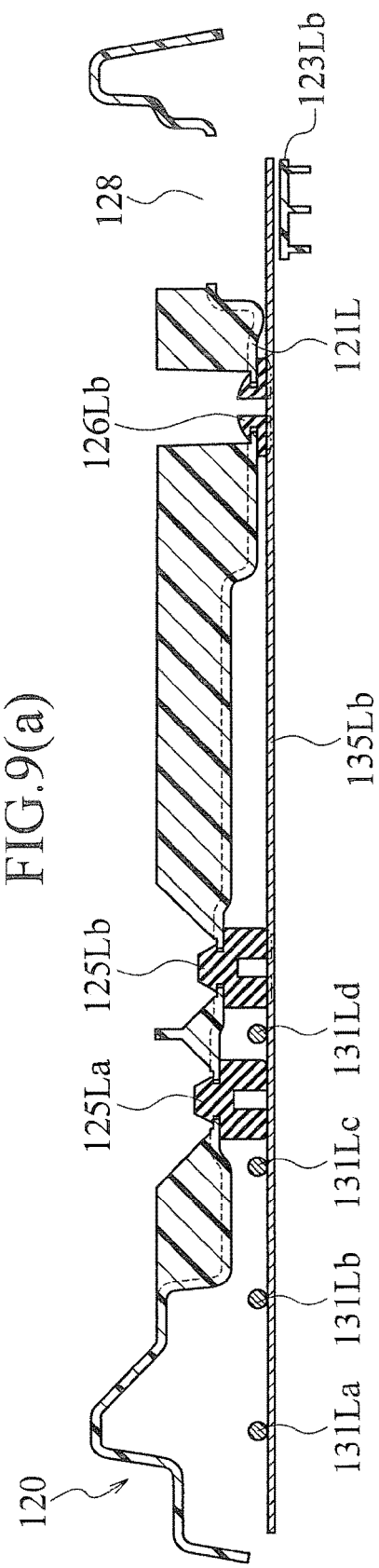
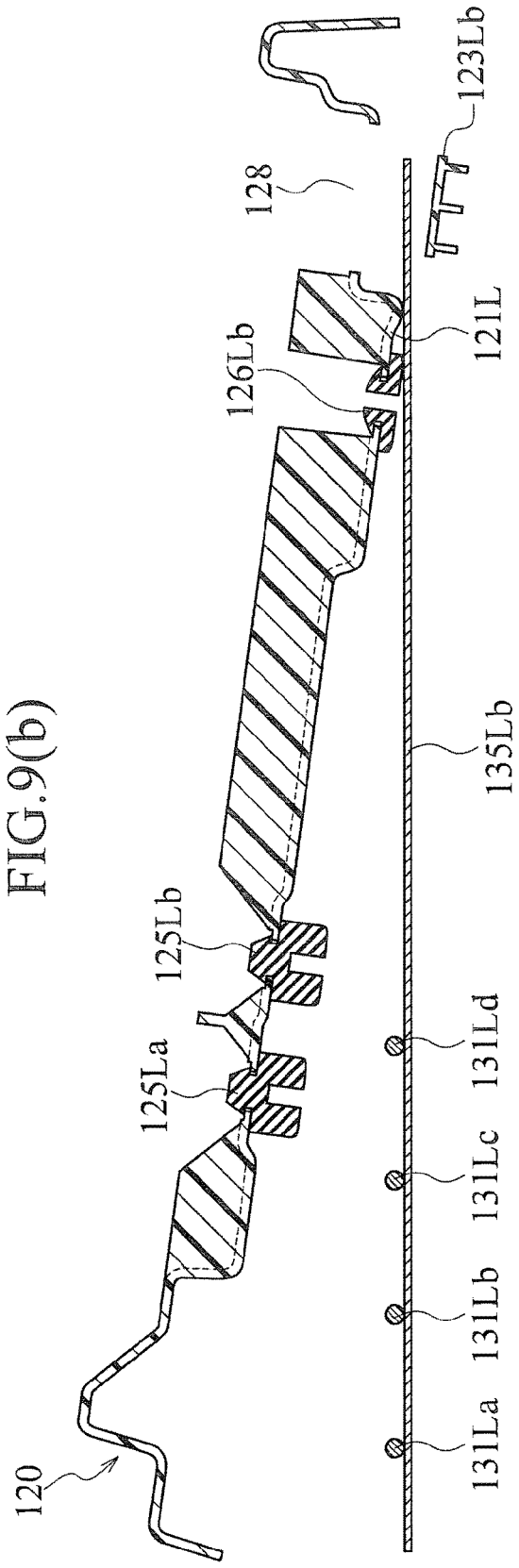
FIG.9(a)
FIG.9(b)

ALL TERRAIN VEHICLE WITH ADJUSTABLE SEAT

BACKGROUND OF THE INVENTION

1. Field of the Invention

The present invention relates to an all terrain vehicle including a rail disposed to extend in a longitudinal direction of the vehicle, and a seat disposed on the rail and being adjustable in position in the longitudinal direction of the vehicle.

2. Description of the Related Art

Conventionally, all terrain vehicles (ATV) have been commercially available, which can travel on various terrains, such as mud, sandy beaches, snowy roads, or mountain roads. One all terrain vehicle of this type is known having a seat adjustable mechanism in which the position of the seat is adjustable in a longitudinal direction of the vehicle (see U.S. Pat. No. 6,582,004 to Hamm).

The seat adjustable mechanism disclosed therein includes a lower rail and an upper rail. Specifically, the lower rail is secured to a frame below a seat and extends in the longitudinal direction of the vehicle. The upper rail is secured to the underside of the seat and extends in the longitudinal direction of the vehicle. The upper rail is engaged with the lower rail, and is slidable over the lower rail.

Meanwhile, all terrain vehicles generally have no roofs and doors. Since all terrain vehicles are used also in mud or sand, foreign materials such as dirt or sand may unnecessarily enter between the lower rail and the upper rail.

Any entry of foreign materials such as dirt or sand between the lower rail and the upper rail makes it difficult for the upper rail to slide smoothly over the lower rail. As a result, in conventional seat adjustable mechanisms, any such entry of dirt, sand or other materials thereinto may result in disabled seat position adjustment function.

SUMMARY OF THE INVENTION

In view of the foregoing problem, it is, therefore, an object of the present invention to provide an all terrain vehicle which provides more reliable longitudinal position adjustment function of a seat, even in the case of entry of dirt, sand or other materials into a seat adjustable mechanism.

To solve the above problem, the present invention has the following aspects. A first aspect of the present invention provides an all terrain vehicle (ATV 10) including: a rail (slide rail 130) in a longitudinal direction of the vehicle; and a seat (front seat 100) on the rail, the seat being adjustable in position in the longitudinal direction of the vehicle, the seat including a rail engaging portion (bottom plate 120) engageable with the rail, the rail engaging portion including: a support (support 121L) extending downward from the rail engaging portion and contacting the rail; a plurality of projections (projections 122La and 122Lb) in a forward direction of the support, the plurality of projections being spaced apart from each other in the longitudinal direction of the vehicle; and a rail holder (rail holder 123L) in a rearward direction of the support, the rail holder holding the rail for longitudinal sliding movement, in which: the rail has a plurality of bar-like parts (bar-like parts 131La to 131Ld) disposed in a forward direction of the support to extend in a vehicle width direction, the bar-like parts being disposed at regular intervals therebetween in the longitudinal direction of the vehicle; the projections are adapted to fittingly receive at least one of the bar-like parts therebetween; and the front end of the seat is pivotally movable upward about the support.

In accordance with this aspect, longitudinal movement of the seat is limited as the at least one of the bar-like parts of the rail is fittingly received between the projections. The front end of the seat is pivotally movable upward about the support. As the front end of the seat is moved upward, the engagement between the projections and the bar-like part of the rail will be released from each other, allowing longitudinal movement of the seat.

More specifically, a rider first moves the front end of the seat upward and then moves the seat in the longitudinal direction of the vehicle. Then, after moving the seat in the longitudinal direction of the vehicle, the rider fits any of the bar-like parts between the projections.

Therefore, even in the case of entry of dirt, sand or other materials into the seat adjustable mechanism, longitudinal position adjustment function of the seat is ensured.

It should be noted that since the front end of the seat is pivotally movable upward about the support, the rider need not raise the entire seat for position adjustment of the seat. This requires less rider's effort for position adjustment of the seat, while ensuring longitudinal position adjustment function of the seat even in the case of entry of dirt, sand or other materials into the seat adjustable mechanism.

A second aspect of the present invention provides the all terrain vehicle in accordance with the first aspect, in which the rail has at least one foreign material outlet (foreign material outlet 132L).

A third aspect of the present invention provides an all terrain vehicle in accordance with the first aspect, in which at least one of the rail and the rail engaging portion is formed of a resin material.

A fourth aspect of the present invention provides an all terrain vehicle in accordance with the third aspect, in which the rail is formed of metal and the rail engaging portion is formed of a resin material.

A fifth aspect of the present invention provides the all terrain vehicle in accordance with the first aspect, in which the rail engaging portion further includes: a pivot shaft (pivot shaft 124Lc) in the vehicle width direction; a shaft support (shaft support 124Ld) for pivotally supporting the pivot shaft; an unlock lever (unlock lever 124a) extending forward from the pivot shaft; and a locking hook (locking hook 124Lb) fixed to the pivot shaft and engageable with any of the bar-like parts.

A sixth aspect of the present invention provides the all terrain vehicle in accordance with the fifth aspect, in which: the pivot shaft is pivotable by a rider's manipulation force to the unlock lever; and the locking hook is disengaged from the any of the bar-like parts as the rider applies an upward manipulation force to the unlock lever.

A seventh aspect of the present invention provides the all terrain vehicle in accordance with the second aspect, further including a plurality of frames (support frames 51a and 51b) in the vehicle width direction, in which: the rail includes: a bottom (bottom 133L) fixed to the plurality of frames; a sidewall (sidewall 134L) extending upward from both ends of the bottom extending in the vehicle width direction; and a side flange (side flange 135L) extending in the vehicle width direction from the upper end of the sidewall; and the at least one foreign material outlet is formed in the bottom.

An eighth aspect of the present invention provides the all terrain vehicle in accordance with the seventh aspect, in which the rail further includes a folded part (folded part 136L) extending downward from an end of the side flange extending in the vehicle width direction, the folded part facing the projections.

A ninth aspect of the present invention provides the all terrain vehicle in accordance with the seventh aspect, the rail engaging portion further includes at least one elastic member (mount rubbers 125La, 125Lb, 126La and 126Lb), the at least one elastic member being disposed in a position where the member faces the side flange.

A tenth aspect of the present invention provides the all terrain vehicle in accordance with the ninth aspect, in which: the at least one elastic member includes: a first elastic member (mount rubbers 126La and 126Lb) on the support; and a second elastic member (mount rubbers 125La, 125Lb) in a forward direction of the support, the second elastic member having a larger degree of distortion than the first elastic member under the same load.

An eleventh aspect of the present invention provides the all terrain vehicle in accordance with the seventh aspect, in which the rail engaging portion has a fitting part (fitting part 121La) extending downward from the support and to be fitted into the rail, the fitting part including: an underside (underside 121Ld) facing the bottom of the rail; and a side (sides 121Lb and 121Lc) facing the sidewall of the rail.

BRIEF DESCRIPTION OF THE DRAWINGS

FIG. 9($a$) and FIG. 9($b$) are cross-sectional views of the bottom plate and the slide rail, taken along the line D-D in FIG. 4.

DESCRIPTION OF THE PREFERRED EMBODIMENTS

Figure 1:
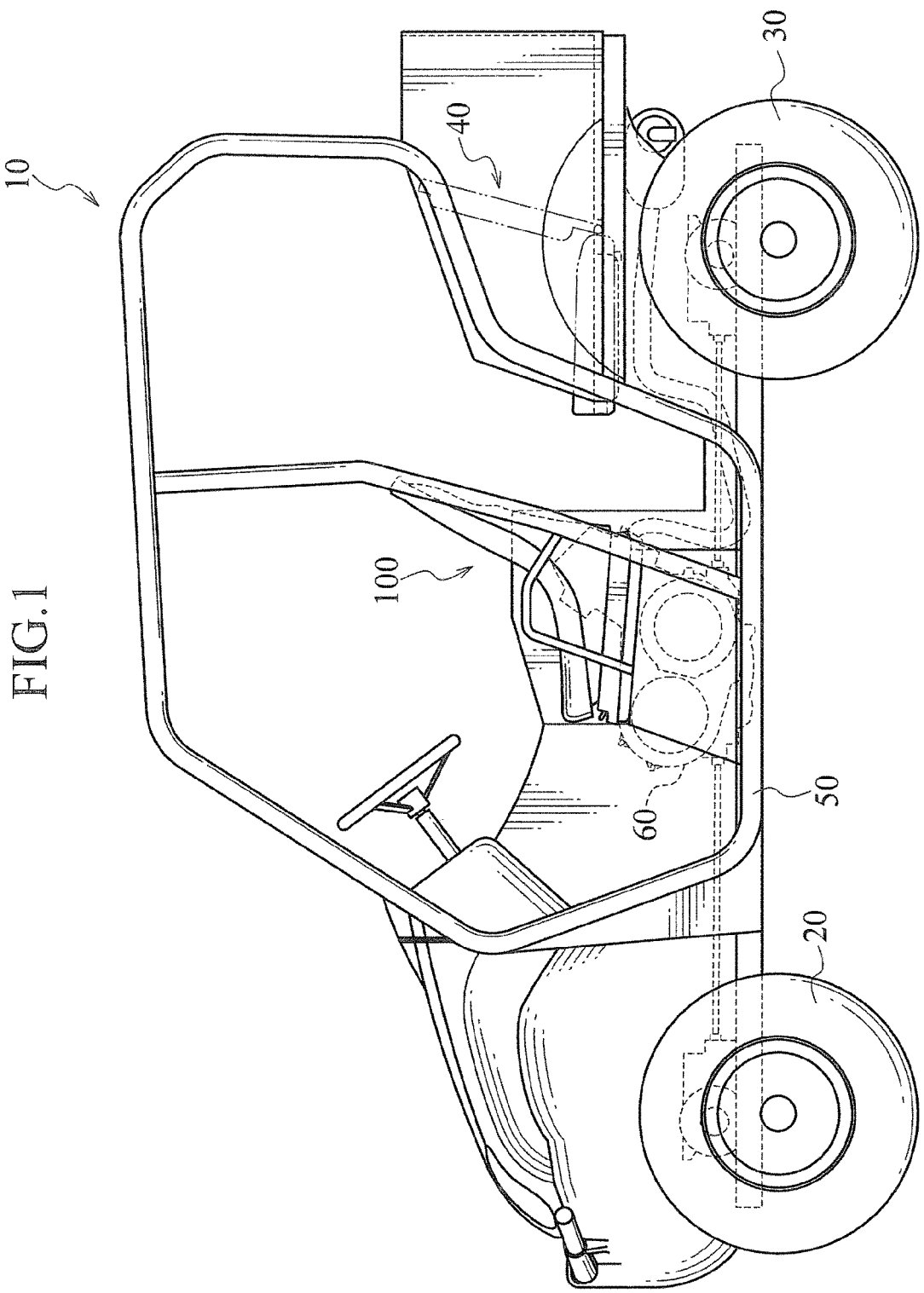
FIG. 1 is a left side elevation of an all terrain vehicle (ATV) in accordance with an embodiment of the present invention.

Embodiments of the present invention will now be described with reference to drawings. It should be noted that in the following descriptions of the drawings, the same or like elements are designated by the same or like reference characters. It should also be noted that each drawing is shown schematically, and may represent different dimensional ratios and the like from those of the actual parts.

Hence, specific dimensions and the like should be determined in consideration of the following descriptions. Further, it is a matter of course that different drawings include elements which have different dimensional relations and ratios.

(1) General Structure

The general structure of an all terrain vehicle (ATV) 10 in accordance with this embodiment will first be described. FIG. 1 is a left side elevation of the ATV 10 in accordance with this embodiment.

As shown in FIG. 1, the ATV 10 includes front wheels 20, rear wheels 30, front seats 100, a rear seat 40, a body frame 50 and an engine 60.

The front wheels 20 and the rear wheels 30 are driven by a driving force generated by the engine 60. The engine 60 is in a generally middle position in a longitudinal direction of the vehicle, and is supported by the body frame 50. On the left and right of the engine 60, there are disposed a pair of front seats 100. In a position above the rear wheels 30, the rear seat 40 is disposed.

As such, the ATV 10 in accordance with this embodiment can accommodate a maximum of four persons. Each front seat 100 is adjustable in position in the longitudinal direction of the vehicle.

(2) Structure of Seat Adjustable Mechanism

Figure 2:
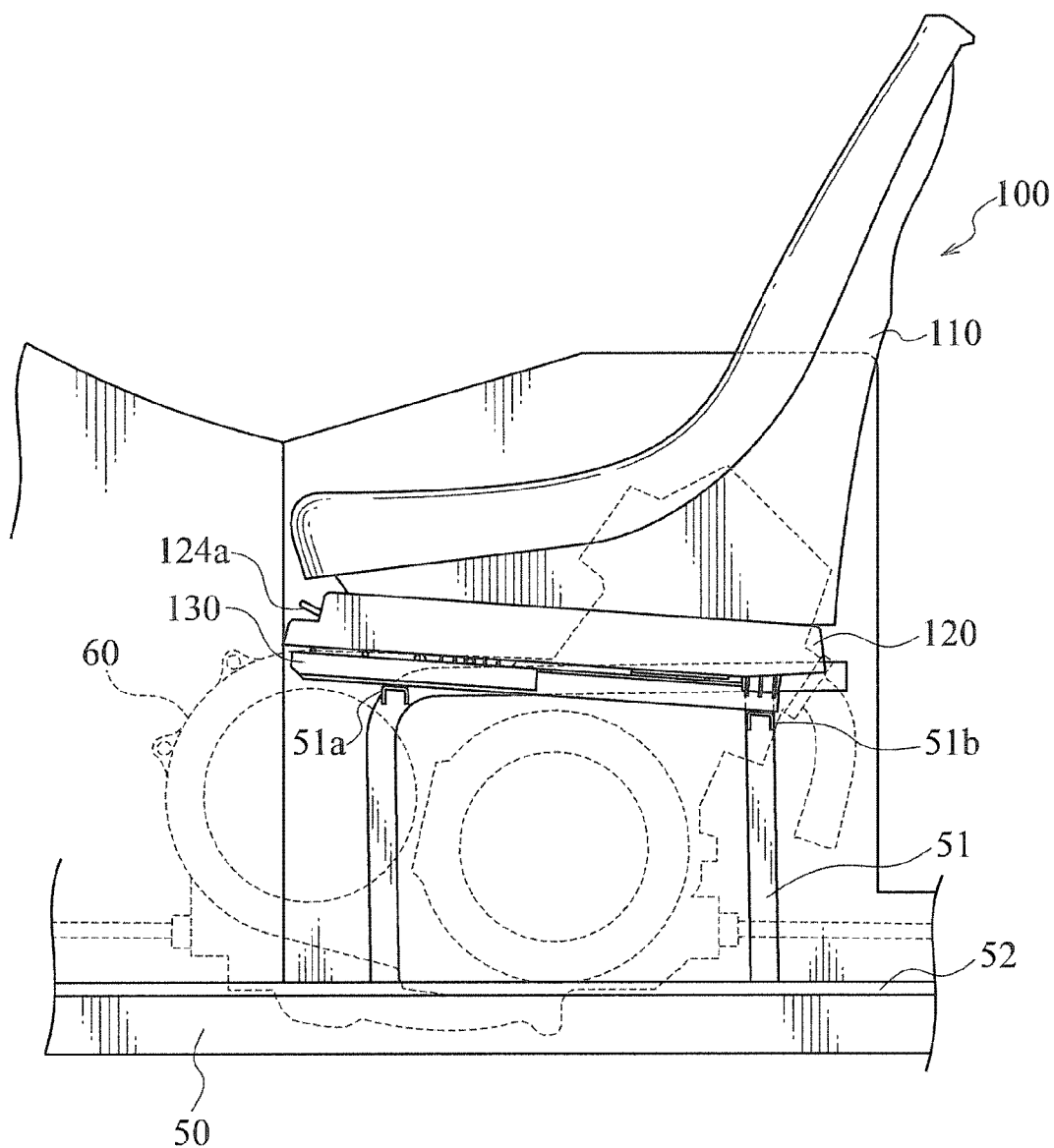
FIG. 2 is a left side elevation of a front seat shown in FIG. 1.

An adjustable position mechanism for the front seat 100 will now be described. FIG. 2 is a left side elevation of the front seat 100.

As shown in FIG. 2, the front seat 100 includes a seat main body 110 and a bottom plate 120. The bottom plate 120 is formed of a resin material, and is fixed to the underside of the seat main body 110.

The bottom plate 120 is supported by a pair of left and right slide rails 130. The slide rail 130 is disposed on a frame 51 fixed to a floor 52. The frame 51 includes two support frames 51$a$ and 51$b$ disposed to extend in a vehicle width direction.

In a position below the bottom plate 120 and the slide rail 130, there is defined a space. This allows foreign materials, such as dirt or sand, expected to escape through foreign material outlets 132L, 132R (see FIG. 3), which will be discussed below, to fall through the slide rail 130 and onto the floor 52.

Figure 3:
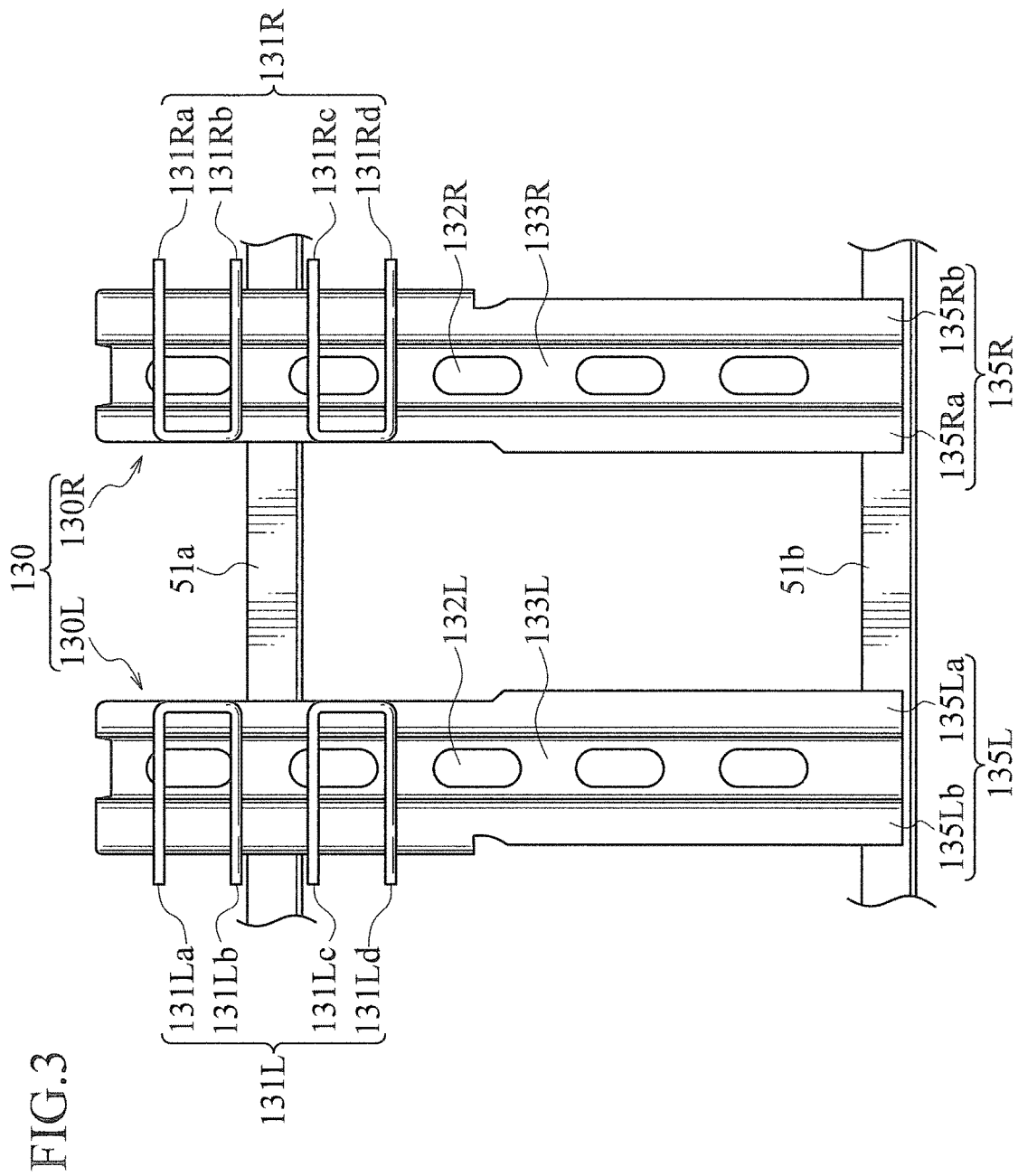
FIG. 3 is a plan view of a slide rail in accordance with the embodiment of the present invention.
Figure 4:
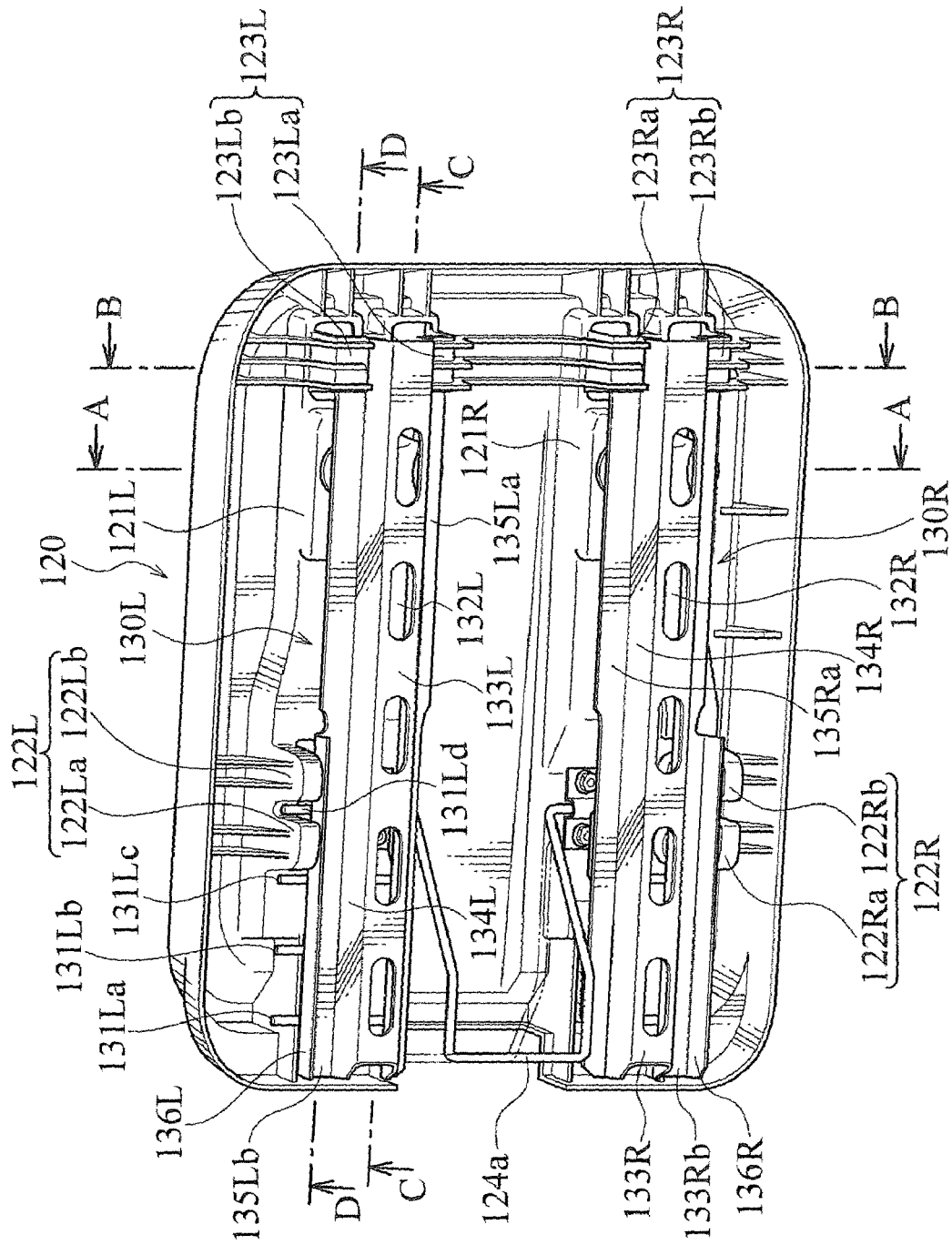
FIG. 4 is a perspective view illustrating the state where a bottom plate in accordance with the embodiment of the present invention is supported by the slide rail.

The structure of the slide rail 130 will now be described. FIG. 3 is a plan view of the slide rail 130. FIG. 4 is a perspective view illustrating the state where the bottom plate 120 is supported by the slide rail 130.

As shown in FIG. 3, the slide rail 130 includes a left slide rail 130L and a right slide rail 130R. The slide rails 130L and 130R are fixed to the support frames 51$a$ and 51$b$ to extend in the longitudinal direction of the vehicle. The slide rails 130L and 130R are each formed of metal (a metal plate).

It should be understood that the slide rail 130R is structured in the same manner as the slide rail 130L and thus the following descriptions will mainly focus on the structure of the slide rail 130L.

The slide rail 130L includes a bar-like section 131L, a foreign material outlet 132L, the bottom 133L, a sidewall 134L, a side flange 135L and a folded part 136L (see FIG. 4 for the sidewall 134L and the folded part 136L).

The bottom 133L is fixed to the support frames 51$a$ and 51$b$. The sidewall 134L extends upward from both lateral ends of the bottom 133L extending in the vehicle width direction. The side flange 135L extends in the vehicle width direction from the upper end of the sidewall 134L. The folded part 136L extends downward from a lateral end of the side flange 135L extending in the vehicle width direction.

The bottom 133L has a foreign material outlet 132 through which foreign materials, such as dirt or sand, will escape. In this embodiment, the bottom 133L has five foreign material outlets 132L.

The side flange 135L includes an inside side flange 135La and an outside side flange 135Lb. The bar-like section 131L is fixed to the top of the side flanges 135La and 135Lb. Specifically, the bar-like section 131L includes four bar-like parts 131La to 131Ld disposed at certain intervals therebetween in the longitudinal direction of the vehicle.

The bar-like parts 131La and 131Lb are obtained by bending one metal bar. In the same manner, the bar-like parts 131Lc and 131Ld are obtained by bending one metal bar.

(2.2) Structure of Bottom Plate

Referring further to FIG. 4, the structure of the bottom plate 120 will be described.

As shown in FIG. 4, the bottom plate 120 includes a support 121 (left support 121L and right support 121R), a projection 122 (left projection 122L and right projection 122R) and a rail holder 123 (left rail holder 123L and right rail holder 123R). The bottom plate 120 is provided with a lock mechanism (see FIG. 7).

The support 121L extends downward from the bottom plate 120 in a manner contacting the slide rail 130L. In the same manner, the support 121R extends downward from the bottom plate 120 in a manner contacting the slide rail 130R.

The projections 122L and 122R are respectively disposed on the lateral side of the slide rail 130L and the slide rail 130R and in a forward direction of the supports 121L and 121R.

The rail holder 123L is disposed in a rearward direction of the support 121L, specifically at the rear end of the bottom plate 120. The rail holder 123L holds the slide rail 130L for longitudinal sliding movement. In the same manner, the rail holder 123R is disposed at the rear end of the bottom plate 120, and holds the slide rail 130R for longitudinal sliding movement.

The projection 122L includes projections 122La and 122Lb spaced apart from each other in the longitudinal direction of the vehicle. In the same manner, the projection 122R includes projections 122Ra and 122Rb spaced apart from each other in the longitudinal direction of the vehicle.

The projections 122La and 122Lb can fittingly receive therebetween any of the bar-like parts 131La to 131Ld. In the same manner, the projections 122Ra and 122Rb can fittingly receive therebetween any of the bar-like parts 131Ra to 131Rd to thereby limit the longitudinal movement of the bottom plate 120.

The projections 122La and 122Lb are facing the folded part 136L of the slide rail 130L. The projections 122Ra and 122Rb are facing a folded part 136R of the slide rail 130R.

Figure 5:
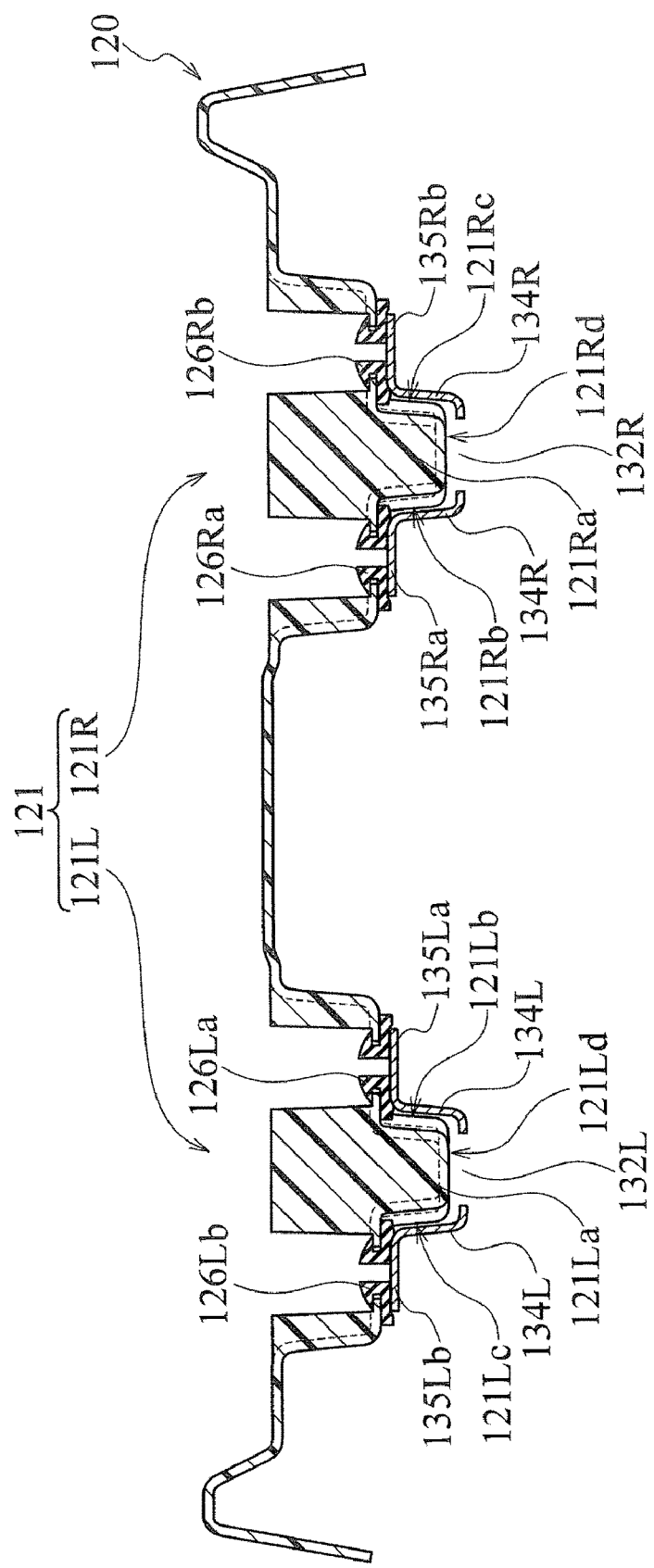
FIG. 5 is a cross-sectional view of the bottom plate and the slide rail, taken along the line A-A in FIG. 4.

The structure of the support 121 will now be described. FIG. 5 is a cross-sectional view of the bottom plate 120 and the slide rail 130, taken along the line A-A in FIG. 4. The right support 121R is structured in the same manner as the left support 121L, and thus the following descriptions will focus on the structure of the left support 121L.

Figure 7:
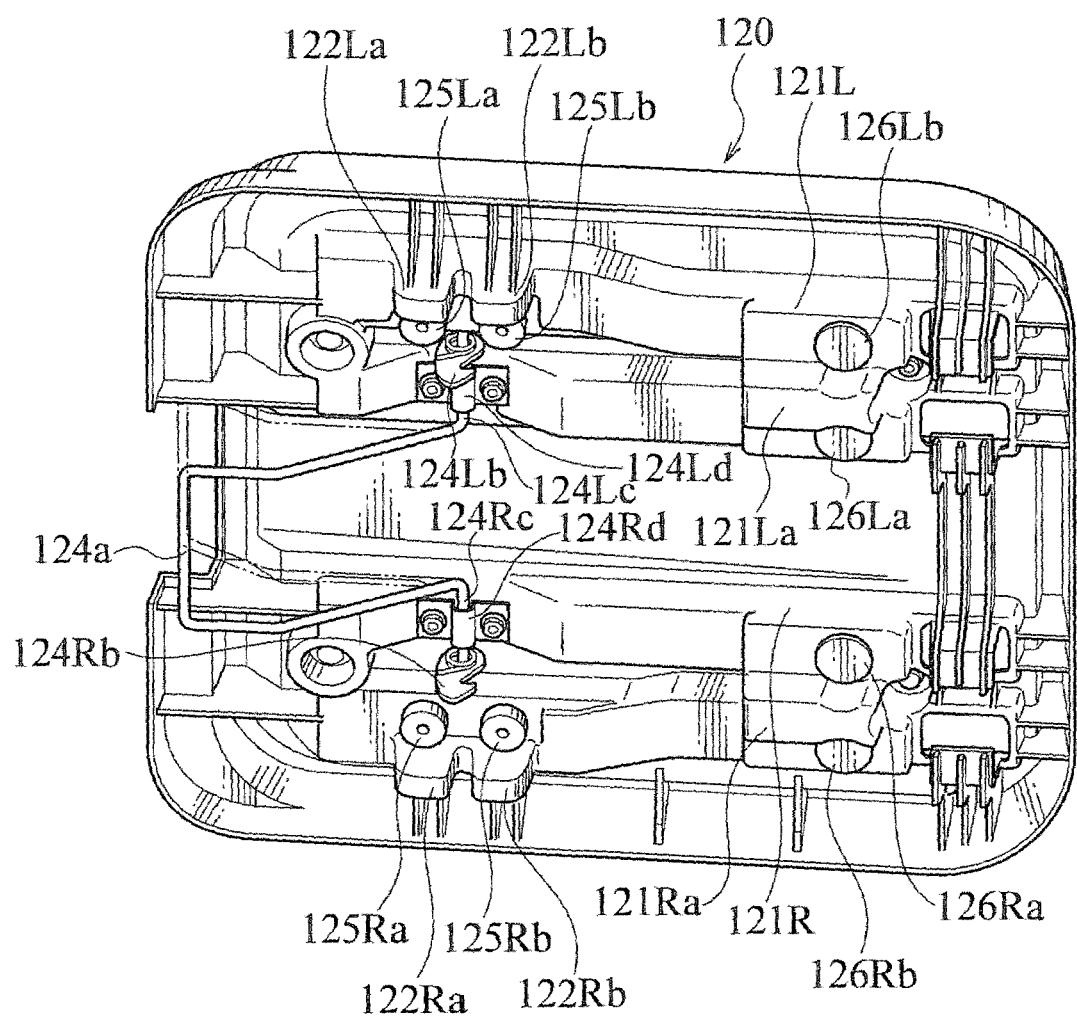
FIG. 7 is a perspective view of the bottom plate shown in FIG. 4.

As shown in FIG. 7, the support 121L has a fitting part 121La extending downward from the support 121L and to be fitted into the slide rail 130L. The fitting part 121La is disposed in a position where it faces the bottom 133L of the slide rail 130L, and extends in the longitudinal direction of the vehicle.

The fitting part 121La includes sides 121Lb and 121Lc facing the sidewall 134L of the slide rail 130L, and an underside 121Ld facing the bottom 133L of the slide rail 130L (as well as foreign material outlets 132L).

On the left and right of the fitting part 121La, mount rubbers 126La and 126Lb are disposed on the support 121L. On the support 121L, the mount rubbers 126La and 126Lb are spaced apart from each other in the vehicle width direction. Specifically, the mount rubbers 126La and 126Lb are disposed in a position where they face the side flanges 135L of the slide rail 130L.

Figure 6:
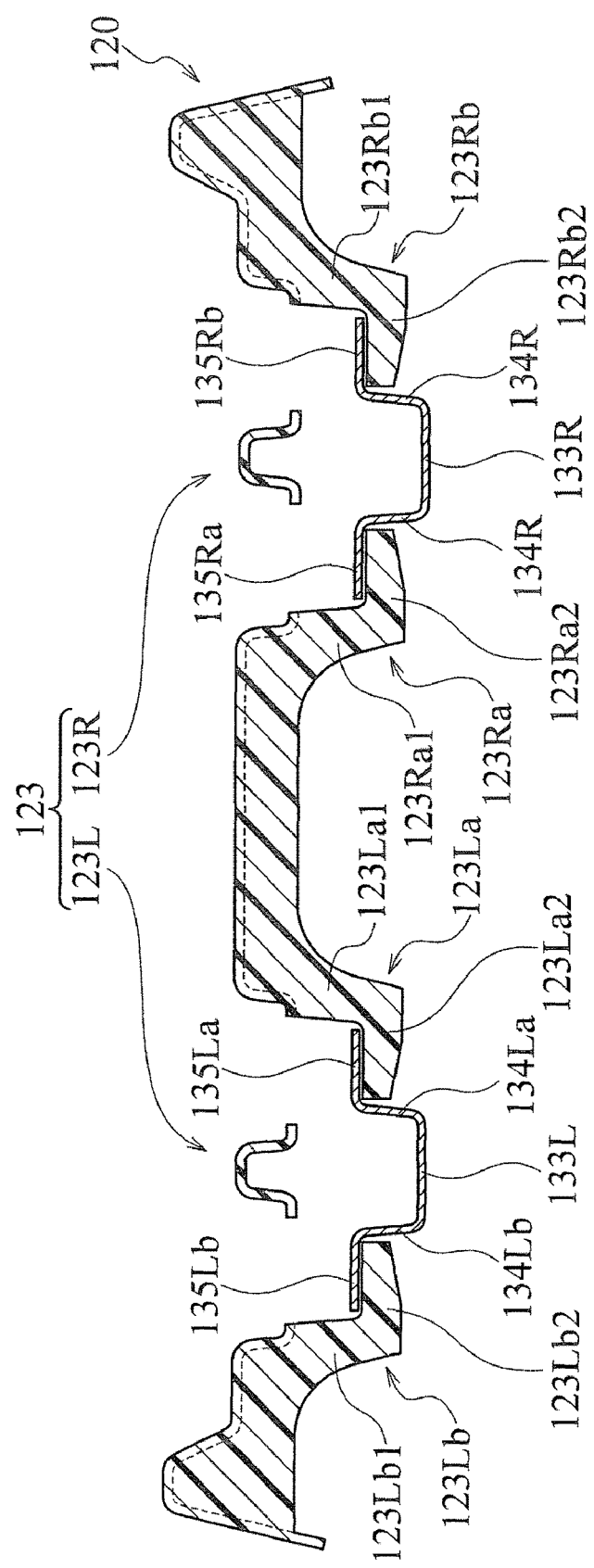
FIG. 6 is a cross-sectional view of the bottom plate and the slide rail, taken along the line B-B in FIG. 4.

The structure of the rail holder 123 will now be described. FIG. 6 is a cross-sectional view of the bottom plate 120 and the slide rail 130, taken along the line B-B in FIG. 4. The right rail holder 123R is structured in the same manner as the left rail holder 123L, and thus the following descriptions will focus on the structure of the left rail holder 123L.

As shown in FIG. 6, the rail holder 123L includes an inside holding part 123La and an outside holding part 123Lb. The holding part 123La is disposed on the bottom plate 120, and shields an underside of the side flange 135La of the slide rail 130L. In the same manner, the holding part 123Lb is disposed on the bottom plate 120, and shields an underside of the side flange 135Lb of the slide rail 130L.

Specifically, the holding part 123La includes a first section 123La1 extending downward from the bottom plate 120, and a second section 123La2 extending in the vehicle width direction from the lower end of the first section 123La1. The second section 123La2 supports the side flange 135La of the slide rail 130L. It is understood that the holding part 123Lb is structured in the same manner as the holding part 123La.

Figure 8:
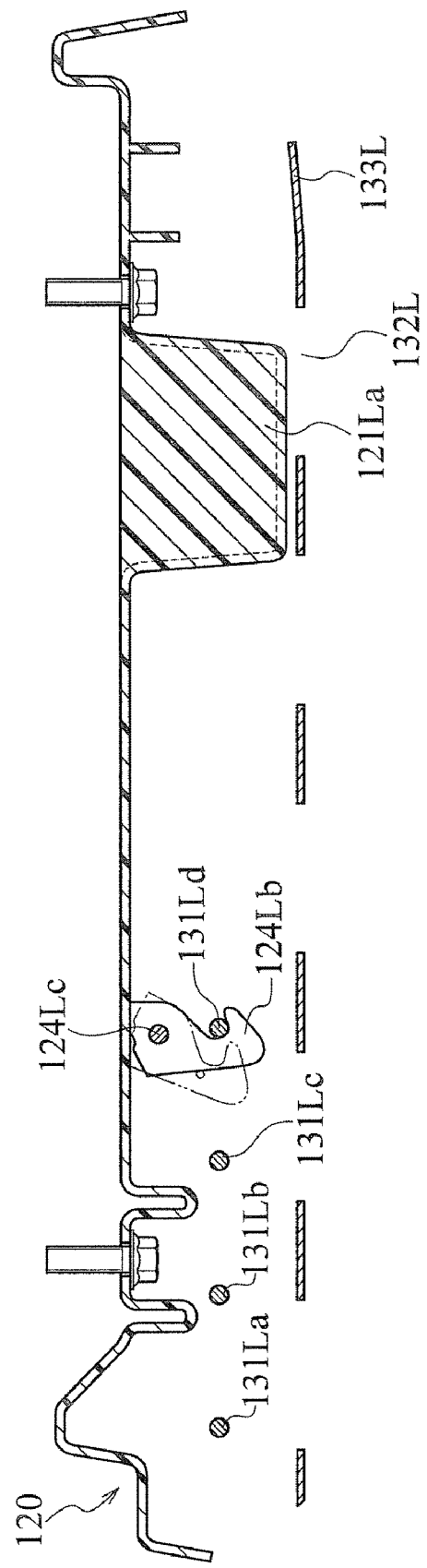
FIG. 8 is a cross-sectional view of the bottom plate and the slide rail, taken along the line C-C in FIG. 4.

The structure of the lock mechanism will now be described. FIG. 7 is a perspective view of the bottom plate 120. FIG. 8 is a cross-sectional view of the bottom plate 120 and the slide rail 130, taken along the line C-C in FIG. 4.

As shown in FIG. 7, the bottom plate 120 is provided with a lock mechanism for limiting the upward movement of the bottom plate 120. The lock mechanism includes an unlock lever 124a, locking hooks 124Lb, 124Rb, pivot shafts 124Lc, 124Rc and shaft supports 124Ld, 124Rd.

Between the projection 122L and the locking hook 124Lb, mount rubbers 125La and 125Lb are disposed to be spaced apart from each other in the longitudinal direction of the vehicle. Between the projection 122R and the locking hook 124Rb, mount rubbers 125Ra and 125Rb are disposed to be spaced apart from each other in the longitudinal direction of the vehicle.

The unlock lever 124a extends forward from one ends of the paired left and right pivot shafts 124Lc, 124Rc. The locking hooks 124Lb, 124Rb are fixed to the respective other ends of the pivot shafts 124Lc, 124Rc. The pivot shafts 124Lc, 124Rc are pivotally supported by the shaft supports 124Ld, 124Rd, respectively. The shaft supports 124Ld, 124Rd are attached to the bottom plate 120.

The locking hook 124Lb is engageable with any of the bar-like parts 131La to 131Ld. Specifically, the locking hook 124Lb is engageable with any one of the bar-like parts 131La to 131Ld of the slide rail 130L fittingly received between the projections 122La and 122Lb.

In the same manner, the locking hook 124Rb is engageable with any of the bar-like parts 131Ra to 131Rd. Specifically, the locking hook 124Rb is engageable with any one of the bar-like parts 131Ra to 131Rd of the slide rail 130R fittingly received between the projections 122Ra and 122Rb.

Referring to FIG. 8, the pivot shaft 124Lc, 124Rc is normally urged in a counterclockwise direction. Thus, the locking hook 124Lb maintains the state of being engaged with any of the bar-like parts 131La to 131Ld. In the same manner, the locking hook 124Rb maintains the state of being engaged with any of the bar-like parts 131Ra to 131Rd.

As an upward manipulation force is applied to the unlock lever 124a by a rider, the pivot shafts 124Lc, 124Rc will pivot in a clockwise direction in a manner disengaging the left and right locking hooks 124Lb, 124Rb together from any of the associated bar-like parts.

FIG. 9(a) is a cross-sectional view of the bottom plate 120 and the slide rail 130L, taken along the line D-D in FIG. 4.

As shown in FIG. 9(a), the mount rubber 125La, the mount rubber 125Lb and the mount rubber 126Lb are disposed on the bottom plate 120 and in a position where they face the side flange 135L of the slide rail 130L. As such, the bottom plate 120 is disposed on the slide rail 130 via so-called rubber mounts.

The mount rubber 125La and the mount rubber 125Lb have a vertical thickness larger than the mount rubber 126Lb. In other words, the mount rubber 125La and the mount rubber 125Lb have a larger degree of distortion than the mount rubber 126Lb under the same load.

The seat position adjustment function will now be described. FIG. 9(b) illustrates the state where the front end of the bottom plate 120 is in a raised position by pivotally moving it upward about the support 121L.

In the state where the lock mechanism is unlocked as described above, the front end of the bottom plate 120 (and the seat main body 110) is movable upward (can be pivotally raised) about the support 121 (left support 121L and right support 121R), as shown in FIG. 9(b).

As the front end of the bottom plate 120 moves upward, the rear end of the bottom plate 120 will move downward. Thus, the bottom plate 120 defines a space 128 which can accommodate the rear end of the slide rail 130L.

In the state shown in FIG. 9(b), the engagement between the projection 122L and any of the bar-like parts 131La to 131Ld, and the engagement between the projection 122R and any of the bar-like parts 131Ra to 131Rd, as shown in FIG. 4, are individually released from each other. This allows the longitudinal movement of the bottom plate 120.

(3) Function and Effect

As discussed above, the ATV 10 in accordance with this embodiment of the present invention includes a slide rail 130 disposed to extend in the longitudinal direction of the vehicle, and a front seat 100 disposed on the slide rail and being adjustable in longitudinal position. The front seat 100 includes the bottom plate 120 engageable with the slide rail 130. The bottom plate 120 includes the supports 121L and 121R, the projections 122L and 122R, and the rail holders 123L and 123R.

The slide rail 130 has the bar-like sections 131L and 131R. The projection 122L includes the projections 122La and 122Lb. The projection 122R includes the projections 122Ra and 122Rb.

Between the projection 122La and 122Lb, the bar-like section 131L can be fittingly received. Between the projection 122Ra and 122Rb, the bar-like section 131R can be fittingly received. The front seat 100 (seat main body 110 and the bottom plate 120) is pivotally movable upward at its front end about the supports 121L and 121R.

For longitudinal position adjustment of the front seat 100, a rider first moves the front end of the front seat 100 upward and then moves the front seat 100 in the longitudinal direction of the vehicle. The rider then fits the bar-like sections 131L and 131R respectively into the projections 122L and 122R. Therefore, even in the case of entry of dirt, sand or other materials into the seat adjustable mechanism, longitudinal position adjustment function of the front seat 100 is ensured.

Further, for position adjustment of the front seat 100, a rider need not raise the entire front seat 100. Thus, this embodiment requires less rider's effort for position adjustment of the front seat 100, while ensuring longitudinal position adjustment function of the front seat 100 even in the case of entry of dirt, sand or other materials into the seat adjustable mechanism.

It should be noted that the bottom plate 120 (and the seat main body 110) is removable from the slide rail 130, providing improved maintainability.

In accordance with this embodiment, the slide rail 130 is formed of metal. The bottom plate 120 is formed of a resin material. This prevents any formation of rust on the slide rail 130 and the bottom plate 120, resulting in disabled position adjustment function of the front seat. Further, since the slide rail 130 is formed of metal, the frame 51 can be improved in mechanical strength.

In accordance with this embodiment, the front seat 100 includes the bottom plate 120 including: the pivot shafts 124Lc and 124Rc disposed to extend in the vehicle width direction; the shaft supports 124Ld and 124Rd for pivotally supporting the pivot shafts 124Lc and 124Rc; the unlock lever 124a extending forward from one ends of the pivot shafts 124Lc and 124Rc; and the locking hooks 124Lb and 124Rb fixed to the respective other ends of the pivot shafts 124Lc and 124Rc and being engageable with any of the bar-like parts of the bar-like sections 131L and 131R.

Accordingly, longitudinal position adjustment of the front seat 100 can be made easily by a rider manipulating the unlock lever 124a, without using any tools.

In accordance with this embodiment, the pivot shafts 124Lc and 124Rc are pivotable by a rider's manipulation force to the unlock lever 124a. The locking hooks 124Lb and 124Rb will be disengaged from the bar-like sections 131L and 131R as the rider applies an upward manipulation force to the unlock lever 124a.

That is, since the direction in which a rider can manipulate the unlock lever 124a and the direction in which the front end of the front seat 100 is movable are the same, it is possible for the rider to manipulate the unlock lever 124a while raising the front end of the front seat 100.

In accordance with this embodiment, the ATV 10 includes the support frames 51a and 51b disposed to extend in the vehicle width direction. The slide rail 130 includes the bottoms 133L and 133R, the sidewalls 134L and 134R, and the side flanges 135L and 135R. The bottoms 133L and 133R have the foreign material outlets 132L and 132R.

This allows the escape of foreign materials, such as dirt or sand, which entered the seat adjustable mechanism, through the bottoms 133L and 133R.

In accordance with this embodiment, the slide rail 130 further includes the folded parts 136L and 136R extending respectively downward from an end of the side flanges 135L and 135R, which extend in the vehicle width direction. The folded parts 136L and 136R respectively face the projections 122L and 122R.

As a result, as the bottom plate 120 is displaced in the vehicle width direction, such displacement will be limited by the projections 122L and 122R. That is, the bottom plate 120 can limit its own displacement in the vehicle width direction.

In accordance with this embodiment, the bottom plate 120 further includes the mount rubbers 125La, 125Lb, 125Ra, 125Rb, 126La, 126Lb, 126Ra and 126Rb. The mount rubbers 125La, 125Lb, 125Ra, 125Rb, 126La, 126Lb, 126Ra and 126Rb are disposed in a position where they face the side flanges 135L and 135R of the slide rail 130.

This allows vibration from the engine 60 to be absorbed by the mount rubbers 125La, 125Lb, 125Ra, 125Rb, 126La, 126Lb, 126Ra and 126Rb, so that the vibration to be transmitted from the engine 60 to the seat main body 110 reduces.

In accordance with this embodiment, the mount rubbers 125La, 125Lb, 125Ra and 125Rb positioned in a forward direction of the supports 121L and 121R have a larger degree of distortion than the mount rubbers 126La, 126Lb, 126Ra and 126Rb disposed on the supports 121L and 121R, under the same load. This allows the locking hooks 124Lb and 124Rb to be kept engaged more easily with the bar-like sections 131L and 131R.

In accordance with this embodiment, the bottom plate 120 has fitting parts 121La and 121Ra extending downward from the supports 121L and 121R and to be fitted into the slide rail 130. The fitting parts 121La and 121Ra include respectively sides 121Lb and 121Lc, and 121Rb and 121Rc, which face respectively the sidewalls 134L and 134R of the slide rail 130.

As a result, as the bottom plate 120 is displaced in the vehicle width direction, such displacement will be limited by the sidewalls 134L and 134R of the slide rail 130. That is, the bottom plate 120 can limit its own displacement in the vehicle width direction.

As discussed above, the present invention has been described referring to the illustrated embodiment. It should be understood, however, the descriptions and/or drawings constituting any part of the disclosure of the present invention do not intend to limit the scope of the present invention. It will also be apparent to those skilled in the art that various alternatives, other embodiments, and operation techniques of the present invention can be considered with reference to the foregoing description.

In the foregoing embodiment, the description has been made of the adjustable position mechanism of the front seat 100. However, the present invention is not limited to the front seat but is also applicable to an adjustable position mechanism for position adjustment of the rear seat.

Further, in the foregoing embodiment, the slide rail 130 is supported by the two support frames 51a and 51b. However, the slide rail 130 may be supported by three or more support frames.

In the foregoing embodiment, the bottom plate 120 is supported by the two slide rails, i.e., the slide rail 130L and the slide rail 130R. However, the slide rail 130L and the right slide rail 130R may be formed as an integral part, so that the bottom plate 120 is supported by the one slide rail.

In the foregoing embodiment, the slide rail 130 is formed of metal, and the bottom plate 120 is formed of a resin material. However, to prevent seizure of the slide rail 130 and the bottom plate 120 due to rust, at least one of the slide rail 130 and the bottom plate 120 may be formed of a resin material.

In the foregoing embodiment, the projection 122L includes the two projections 122La and 122Lb. Also, the projection 122R includes the two projections 122Ra and 122Rb. However, the number of the projections may not be limited to two but may be three or more.

As such, it should be understood that the present invention includes various other embodiments or the like which are not described herein. Therefore, the scope of the present invention should be decided only by the particular matters of the invention according to the claims that are adequate from the above disclosure.

What is claimed is:

1. An all terrain vehicle comprising:
    a rail in a longitudinal direction of the vehicle; and
    a seat on the rail, the seat being adjustable in position in the longitudinal direction of the vehicle, the seat including a rail engaging portion engageable with the rail, the rail engaging portion comprising:
        a support extending downward from the rail engaging portion and contacting the rail;
        a plurality of projections in a forward direction of the support, the plurality of projections being spaced apart from each other in the longitudinal direction of the vehicle; and
        a rail holder in a rearward direction of the support, the rail holder holding the rail for longitudinal sliding movement, wherein:
        the rail has a plurality of bar-like parts disposed in a forward direction of the support to extend in a vehicle width direction, the bar-like parts being disposed at certain intervals therebetween in the longitudinal direction of the vehicle;
        the projections are adapted to receive at least one of the bar-like parts therebetween; and
        the front end of the seat is pivotally movable upward about the support.

2. The all-terrain vehicle according to claim 1 wherein the rail has at least one foreign material outlet.

3. The all-terrain vehicle according to claim 1 wherein at least one of the rail and the rail engaging portion is formed of a resin material.

4. The all-terrain vehicle according to claim 3 wherein the rail is formed of metal and the rail engaging portion is formed of a resin material.

5. The all terrain vehicle according to claim 1 wherein the rail engaging portion further comprises:
    a pivot shaft in the vehicle width direction;
    a shaft support for pivotally supporting the pivot shaft;
    an unlock lever extending forward from the pivot shaft; and
    a locking hook fixed to the pivot shaft and engageable with any of the bar-like parts.

6. The all-terrain vehicle according to claim 5 wherein: the pivot shaft is pivotable by a rider's manipulation force to the unlock lever; and the locking hook is disengaged from the any of the bar-like parts as the rider applies an upward manipulation force to the unlock lever.

7. The all terrain vehicle according to claim 2 further comprising
    a plurality of frames in the vehicle width direction, wherein:
    the rail comprises:
        a bottom fixed to the plurality of frames;
        a sidewall extending upward from both ends of the bottom extending in the vehicle width direction; and
        a side flange extending in the vehicle width direction from the upper end of the sidewall; and
    the at least one foreign material outlet is formed in the bottom.

8. The all terrain vehicle according to claim 7 wherein the rail further comprises a folded part extending downward from an end of the side flange extending in the vehicle width direction, the folded part facing the projections.

9. The all terrain vehicle according to claim 7 wherein the rail engaging portion further comprises at least one elastic member, the at least one elastic member being disposed in a position where the elastic member faces the side flange.

10. An adjustable seat assembly for attachment to a vehicle comprising:
    a first rail affixed to the upper portion of a vehicle generally on the left side of the vehicle and extending in a longitudinal direction of the vehicle;
    a second rail affixed to the upper portion of a vehicle generally on the right side of the vehicle and extending in a longitudinal direction of the vehicle; and
    a seat disposed on top of said first rail and said second rail, said seat being adjustable in position along the top of said first rail and said second rail in the longitudinal direction of the vehicle, said seat including a first rail engaging portion engageable with said first rail and including a second rail engaging portion engageable with said second rail, said first rail engaging portion and second rail engaging portions comprising:
- a first support extending downward from said first rail engaging portion and contacting said first rail;
- a second support extending downward from said second rail engaging portion and contacting said second rail;
- a first plurality of projections in a forward direction of said first support, each projection of the first plurality of projections being spaced apart in the longitudinal direction of the vehicle;
- a second plurality of projections in a forward direction of said second support, each projection of the first plurality of projections being spaced apart in the longitudinal direction of the vehicle;
- a first rail holder in a rearward direction of said first support, said first rail holder holding said first rail for longitudinal sliding movement, wherein:
  - said first rail has a first plurality of bar-like parts, disposed in a forward direction of the first support to extend in a vehicle width direction, said bar-like parts being disposed at regular intervals therebetween in the longitudinal direction of the vehicle;
  - said first plurality of projections is adapted to receive at least one of the first plurality of bar-like parts therebetween;
- a second rail holder in a rearward direction of said second support, said second rail holder holding said second rail for longitudinal sliding movement, wherein:
  - said second rail has a second plurality of bar-like parts, disposed in a forward direction of the second support to extend in a vehicle width direction, said bar-like parts being disposed at regular intervals therebetween in the longitudinal direction of the vehicle;
  - said second plurality of projections is adapted to receive at least one of the second plurality of bar-like parts therebetween; and
- wherein the front end of the seat is pivotally movable upward about the first and second supports.

11. The adjustable seat assembly according to claim 10 wherein at least one of the first rail and the second rail, or the first rail engaging portion and the second rail engaging portion, are formed of a resin material.

12. The adjustable seat assembly according to claim 11 wherein said first rail and said second rail are formed of metal and said first rail engaging portion and said second rail engaging portion are formed of a resin material.

13. The adjustable seat assembly according to claim 10 wherein: said first rail engaging portion further comprises:
- a first pivot shaft extending substantially perpendicular to the length of the first rail;
- a first shaft support for pivotally supporting the first pivot shaft; and
- a first locking hook affixed to said first pivot shaft and engageable with any of the first plurality of bar-like parts;

said second rail engaging portion further comprises:
- a second pivot shaft extending substantially perpendicular to the length of the second rail;
- a second shaft support for pivotally supporting the second pivot shaft; and
- a second locking hook affixed to said second pivot shaft and engageable with any of the second plurality of bar-like parts; and
- an unlock lever extending forward from said first and second pivot shafts.

14. The adjustable seat assembly according to claim 13 wherein said first pivot shaft and said second pivot shaft are pivotable by a rider's manipulation of the unlock lever; and said first locking hook and said second locking hook are disengaged from said first plurality of the bar-like parts and said second plurality of the bar-like parts as the rider applies an upward force to the unlock lever.

15. The adjustable seat assembly according to claim 10 wherein said first rail and said second rail each have at least one foreign material outlet.

16. The adjustable seat assembly according to claim 15 wherein:
- said first rail is fixed on top of a plurality of frames extending substantially perpendicular to the length direction of said first rail;
- said second rail is fixed on top of said plurality of frames in a manner substantially parallel to said first rail;
- said first rail additionally comprises:
  - a first sidewall extending upward from both ends of the bottom of said first rail and extending in a direction substantially parallel to the plurality of frames;
  - a first side flange extending in a direction substantially parallel to the plurality of frames from the upper end of said first sidewall; and
  - the at least one foreign material outlet of said first rail is formed in the bottom of said first rail; and
- said second rail additionally comprises:
  - a second sidewall extending upward from both ends of the bottom of said second rail and extending in a direction substantially parallel to the plurality of frames;
  - a second side flange extending in a direction substantially parallel to the plurality of frames from the upper end of said second sidewall; and
  - the at least one foreign material outlet of said second rail is formed in the bottom of said second rail.

17. The adjustable seat assembly according to claim 16 wherein:
- said first rail further comprises a first folded part extending downward from an end of said first side flange and extending substantially parallel to the plurality of frames, said first folded part facing the first plurality of projections; and
- said second rail further comprises a second folded part extending downward from an end of said second side flange and extending substantially parallel to the plurality of frames, said second folded part facing the second plurality of projections.

18. The adjustable seat assembly according to claim 16 wherein:
- said first rail engaging portion further comprises at least one first elastic member, the at least one first elastic member being disposed in a position where the first elastic member faces the first side flange; and
- said second rail engaging portion further comprises at least one second elastic member, the at least one second elastic member being disposed in a position where the second elastic member faces the second side flange.

19. The adjustable seat assembly according to claim 18 wherein:
- said at least one first elastic member comprises:
  - a first elastic member on the first support; and
  - a first second elastic member in a forward direction of the first support, said first second elastic member having a larger degree of distortion than the first first elastic member under the same load; and
- said at least one second elastic member comprises:

a second first elastic member on the second support; and a second elastic member in a forward direction of the second support, said second elastic member having a larger degree of distortion than the second first elastic member under the same load.

20. The adjustable seat assembly according to claim 16 wherein:

said first rail engaging portion has a first fitting part extending downward from the first support and formed to be fitted into the first rail, said first fitting part comprising:

a first underside facing the bottom of the first rail; and a first side facing the first sidewall of the first rail; and said second rail engaging portion has a second fitting part extending downward from the second support and formed to be fitted into the second rail, said second fitting part comprising:

a second underside facing the bottom of the second rail; and a second side facing the second sidewall of the second rail.

* * * * *